United States Patent Office 3,318,737
Patented May 9, 1967

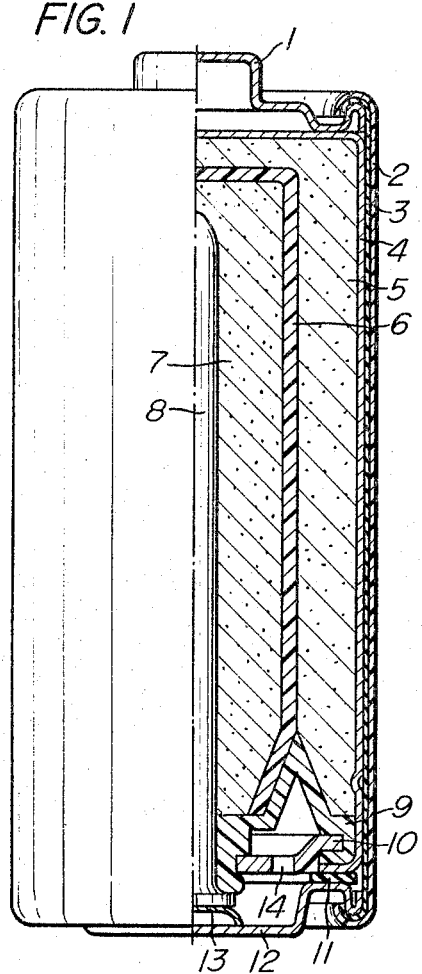
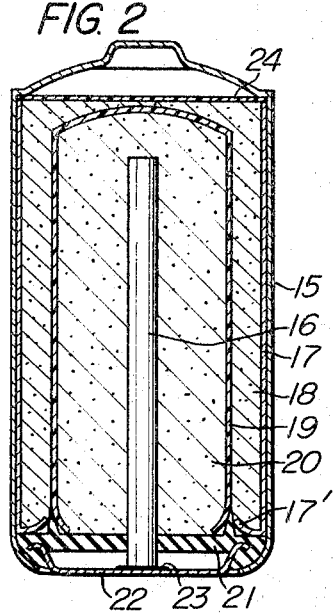
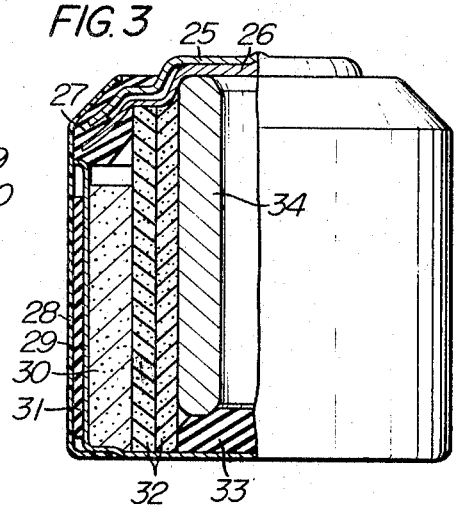

3,318,737
ALKALI DRY CELLS
Jun Watanabe, Kobe, Akira Nakashima, Hirakata-shi, and Naohiro Matsuda, Yao-shi, Japan, assignors to Matsushita Electric Industrial Co., Ltd., Osaka, Japan, a corporation of Japan
Filed Dec. 23, 1964, Ser. No. 420,705
Claims priority, application Japan, Dec. 25, 1963, 38/71,138
4 Claims. (Cl. 136—133)

This invention relates to an alkali dry cell comprising a cathode case having electricity-generating elements accommodated therein, a sealing member of plastic material for sealing said cathode case, and a plastic film of anti-electrolyte nature covering the peripheral portion of said sealing member and the side-wall of said anode case, said sealing member consisting of an inner sleeve having a central through hole with an anode collector passing therethrough and a peripheral stepped portion on which the inner peripheral portion of a sealing washer is mounted, an outer sleeve disposed outside said inner sleeve and coupled therewith by a connecting web with a space formed therebetween, a brim portion formed on the top face of said outer sleeve and on which the outer peripheral portion of said sealing washer is mounted, a rib formed on the upper peripheral portion of said brim portion, and a rib formed on the lower peripheral portion of said brim portion to form a groove between the same and said outer sleeve, into which groove is inserted a curved open end portion of said cathode case.

The exact nature of this invention as well as the advantages thereof will be readily appreciated from the following description taken in connection with the accompanying drawings in which:

FIGURE 1 shows, partly in a section, a typical alkali dry cell.

FIGURES 2 and 3 are sectional views of other known dry cell constructions.

Figure 4:
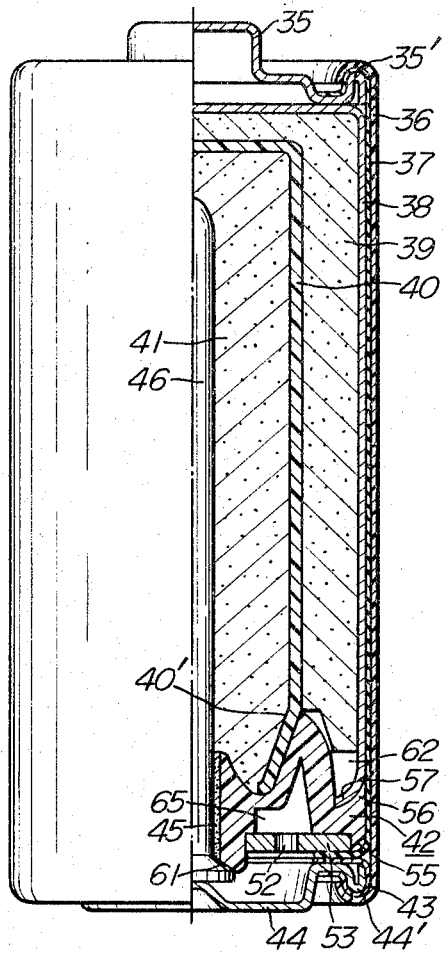
FIGURE 4 shows, partly in section, an alkali dry cell embodying the invention.

Referring to FIG. 1, 1 designates a cathode cap, 2 an outer casing can, 3 a kraft paper cylinder, 4 a cathode case, 5 a cathode compound mainly consisting of manganese dioxide and graphite, 6 a separator, 7 a gel anode of caustic alkali electrolyte having zinc powders dispersed therein, 8 a brass collector, 9 a sealing ring, 10 a sealing plate, 11 a paper ring, 12 a bottom plate serving as an anode terminal, 13 an anode contact spring, and 14 a perforation for gas exhaustion.

Referring to FIG. 2, 15 shows an outer casing, 16 a collector bar of tin-plated iron, 17 an inner casing, 18 a cathode compound mainly consisting of manganese dioxide and graphite, 19 a separator, 20 a gel anode of caustic alkali electrolyte having zinc powders dispersed therein, 21 an insulating ring, 22 a sealing tin plate to which the collector bar 16 is soldered as shown at 23, and 24 a polyvinyl-chloride sheet.

Referring now to FIG. 3, 25 designates an outer sealing plate, 26 an inner sealing plate, 27 an insulating ring with the inner flanges of plates 25 and 26 embedded therein, 28 an outer case, 29 an inner case, 30 a cathode compound mainly consisting of manganese dioxide and graphite, 31 a kraftpaper cylinder for absorbing leaked electrolyte, 32 an impregnation layer of caustic potash electrolyte, 33 an insulating plate, and 34 a zinc anode.

In the alkali dry cell shown in FIG. 1, the peripheral portion of sealing ring 9 is in contact with the end face of cathode compound 5, and when the sealing ring 9 is being fastened by bending of the opening end of cathode case 4, the end face of cathode compound 5 serves to hold the sealing ring 9. Consequently, when the cathode compound 5 has contracted by virtue of a long time storage or discharge reaction, the fastening effect of the opening end of cathode case 4 is decreased, resulting in liquid leakage.

In the alkali dry cell shown in FIG. 2, the peripheral portion of insulating ring 21 is in contact with the bent opening end 17' of inner casing 17, the bent portion 17' serving to hold the insulating ring 21, when the insulating ring 21 being fastened by bending of the opening end of outer casing 15. This construction is free from the default as in the case of FIG. 1, but since the sealing plate 22 of negative polarity and the outer casing 15 of positive polarity are separated from each other by the insulating ring 21 only, cathode defualt results as described below.

Thus, when the inner gas pressure has been raised, it pushes out the insulating ring 21, seeking leakage passage through between the insulating ring 21 and the bent portion 17', and then between the ring 21 and the outer casing 15. Along with such leakage gas, the liquid electrolyte reaches the peripheral surface of insulating ring 21, resulting in short circuit between cathode and anode. Thus, a large cell capacity cannot be expected to obtain.

Further, in the alkali dry cell shown in FIG. 3, when the atmospheric humidity has been raised, the surface plating of sealing plate 26, in contact with the anode 34 amalgamated with mercury, is amalgamated with mercury contained in the anode 34, with increase in leakage current there, facilitating leakage of electrolyte.

The present invention provides alkali dry cells having various features to be described, eliminating the above-enumerated defaults of conventional alkali dry cells.

A feature of the present invention is prevention of liquid leakage.

Another feature of the present invention is extremely little loss in performance after a long period of storage.

A further feature of the present invention is increased cell capacity with stable performance.

An embodiment of the present invention will now be described.

Referring to FIG. 4, 35 designates a cathode terminal cap of nickel-plated iron plate having a peripheral rib 35', 36 an outer casing can of nickel-plated iron plate, 37 a thermo-contractive plastic tube of anti-electrolyte nature, such as of polyvinyl chloride, 38 a nickel-plated iron case having an inwardly bent upper end 57, 40 a separator of polyvinyl alcohol, 41 a gel anode of caustic potash electrolyte containing carboxy methyl cellulose with zinc powders dispersed therein, 42 a sealing member of gas-permeable flexible plastic material, such as of polyethylene, polypropylene, or the like, 43 a thermo-contractive tube, 44, a combined anode terminal and bottom plate with a rib 44' formed in the peripheral portion, 45 a non-driable adhesive layer, and 46 a brass collector.

Figure 5:
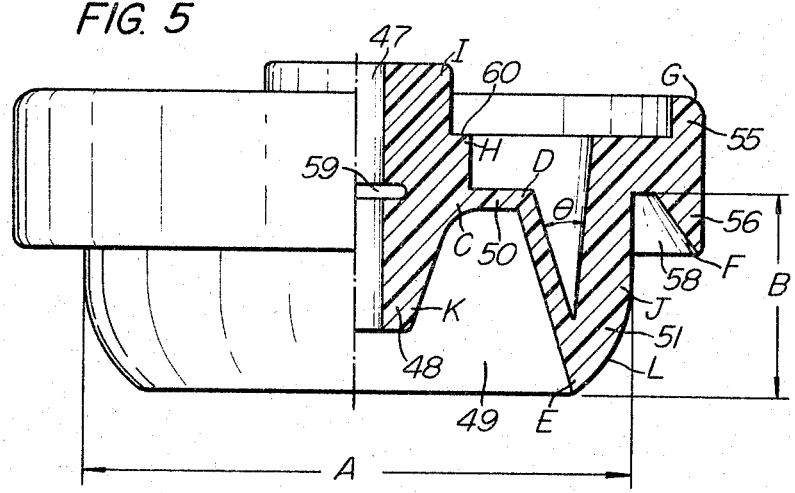

A preferable example of sealing member 42 is shown in FIG. 5. It comprises an inner sleeve 48 having a central through hole 47 which the collector 46 passes through, an outer sleeve 51 coupled with the inner sleeve by a connecting web 50 with a space 49 formed outside the inner sleeve, a brim portion 54 formed on the upper face of outer sleeve 51 for receiving the peripheral portion of a sealing washer 53 of nickel-plated iron having gas exhaust perforations 52 (see FIG. 4), a rib 55 formed on the upper peripheral portion of brim portion 54, and a rib 56 formed on the lower peripheral portion of brim portion 54 for providing a groove 58 between the rib 56 and the outer sleeve 51, into which the upper end portion 57 of case 38 is inserted for fixation (see FIG. 4). 69 is a groove formed in the through hole 47, and 60 is a stepped portion formed on the inner sleeve 48 for receiving one end of the sealing washer 53, the other end thereof being received on the brim portion 54.

The outer diameter A of outer sleeve 51 is made little larger than the inner diameter of inwardly curved end 57 of iron case 38, so that liquid-tight contact may be established between the sleeve 51 and the case end 57.

When the larger sleeve 51 is being press inserted into the smaller case end 57, it is highly desirable that there occurs no strain in the sealing member 42, but elasticity in the direction towards the centre only. For this purpose, the outer sleeve 51 and the connecting web 50 should embrace an angle θ therebetween to provide a V-shaped projection E. In addition, for facilitating the press insertion work of sealing member 42 into case 38, the lower end of outer sleeve 51 should be formed with slant face L, and for preventing the sealing member 42 from escaping upwardly, when the sealing member 42 has been inserted into the case 38, the outer sleeve 51 should have an axially extending portion J.

In order to provide good liquid-tightness, the rib 56 is formed with a face F in contact with the curved end portion 57 of case 38 for enlarging the contact area and also for increasing the leakage distance from inside the cell to outside. Such leakage distance is desired to be long, but too long distance would result in too short distance between the case end 57 and the separator 40, so that the case end 57 might readily be wetted by the electrolyte to cause liquid leakage. Consequently, the end portion 57 of case 38 should be so curved that it has the opening diameter larger than the diameter of separator 40.

The projection E is required for separating the cathode compound 39 from the anode 41 by way of separator 40, and should be arranged to exist at the position where the contact surface between the moulded cathode compound 39 and the separator 40 terminates. If the projection E should be too short, the separator 40 made of soft paper or the like would be so deformed that it pushes out the anode 41 towards the cathode compound 39, result in short-circuiting. On the other hand, if the projection E should be too long, it would provide an appreciable resistance between the separator 40 and the cathode compound 39, and the cell reaction would thereby be obstructed.

The angle θ, by which the end portion 40' of separator 40 is bent inwardly, should preferably be small as far as possible. By providing a corner D in the sealing member 42, certain variations in the height of separator 40 is rendered allowable, and can be compensated for by bending in the outer sleeve 51 towards C and K. If there is no corner D, an acute corner is formed at C and causes the separator 40 to be deformed.

The thickness of connecting web 50, from C through D to E, should be 0.2 to 1.0 mm., preferably less than 0.5 mm., for allowing gas permeation therethrough to facilitate dissipation of inner gas produced during cell discharge. In addition, the bend D provides increased surface area.

The rib 55 prevents the tube 37 from being damaged by the end of washer 53. Such a damage of tube 37 would cause liquid leakage or short-circuiting. In addition, the upper end portion G of rib 55 is curved for assuring good bending and fastening of the end portion of tube 37.

The collector 46 is of T-shaped cross-section, with a slant face 61 formed between the upper end of vertical portion and the lower face of horizontal portion. The vertical portion of collector 46 has a diameter larger than the diameter of through hole 47 by 0.1 to 0.5 mm., so that the former is forced to pass through the latter. As a result, the portion I of sealing member 42 is forced to bend outwardly by virtue of the slant face 61 for securing the washer 53 in position.

The space 62 defined by the case end 57, the outer sleeve 51 of sealing member 42, and the end face of cathode compound 39, provides a gas reservoir, and the gas accumulated therein escapes out through the packing effect between the case end 57 and the sealing member 42.

The non-driable adhesive layer 45 existing between contact surface of collector 46 and sealing member 42 may preferably be formed by epoxy derivatives, hydrated glycerol esters, aromatic derivatives having carboxyl radicals, or the like, that have good adhesivity with metals, and exhibit viscosity or non-driability after evaporation of solvents. One example of such adhesive agents may consists of 40 parts of epoxy resin, 10 parts of hydrogenated rosin of glycerol ester, 10 parts of butyl gum, and 40 parts of toluene. More than two kinds of resin, rubber, etc., may be dissolved in a solvent which dissolves also plastics forming the sealing member 42. The unit potential of anode zinc is from −1.3 to 1.4 v., and in addition, the anode is that side which is dissolved, so that leakage current would otherwise flow during storage to cause liquid leakage through between contact surfaces of the collector and sealing member. However, the existence of non-driable adhesive layer 45 affords intimate adhesion of a part of sealing member 42 by dissolution thereof, and even if it is subjected to mechanical shocks, good and intimate adhesion is assured there, resulting in remarkably improved liquid-proofness. The non-driable adhesive material is partly accumulated in the groove 59 for insuring good adhesivity as well as leakage-proofness with respect to the electrolyte.

Figure 6:
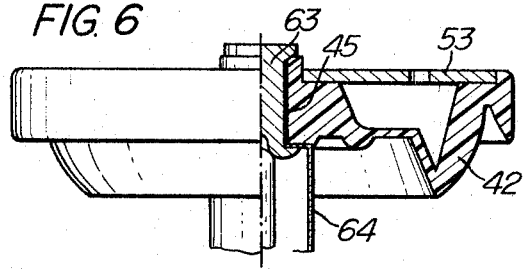
FIGURES 5 and 6 are enlarged views of sealing members according to the invention.

The collector may be formed with an electricity collecting portion 64 and an eyelet portion 63, as shown in FIG. 6.

Preferable composition of cathode compound 39 may be 90 parts of electrolytic manganese dioxide and 10 parts of scaly graphite, while preferable composition of gel anode 41 may be 100 parts of caustic potash, 16 parts of flowers of zinc, and 100 parts of water, with 0.5% of carboxy methyl cellulose and 0.5% of polyacrylate soda.

The plastic tube 37 may mainly be of polyvinyl chloride with polyvinyl acetate or polyvinylidene chloride mixed thereto. It may, alternatively, be of their copolymer with little amount of plasticizer and minute amount of stabilizer. Its thickness may be 0.05 to 0.5 mm., and the tube contracts in both lateral and longitudinal directions when heated.

Thermo-plastic resins are readily deformable at temperatures higher than softening point but lower than flowing point, and if a tube of such a thermo-plastic resin of appropriate diameter and length formed by mechanical extrusion is heated at a temperature higher than its softening temperature but lower than its flowing temperature to have the tube diameter increased appropriately, and then quenched, the tube remains even at normal temperatures in an expanded state with residual strain. When such a tube expanded as above is heated to a temperature higher than its softening point, the residual strain is removed and the tube contract to recover is diameter before expansion. The thermo-contractive tube is such a tube that the above-described nature is utilized to make the same.

In place of such a thermo-contractive tube, an elastic tube having diameter increased by mechanical force may be used, and the mechanical force is removed after application of the tube to the cell structure.

According to the preferred embodiment of the invention shown in FIG. 4, the cathode compound 39 is moulded in the case 38 with its open end portion 57 curved inwardly, and the gel anode 41 is filled in the cell with the separator 40 interposed therebetween. Simultaneously, the polyethylene sealing member 42 is applied to the opening end portion 57 of case 38 into contact with the latter, and the washer 53 is mounted on the sealing member 42. The cap 35 is then applied to the closed end of case 38, with the peripheral rib 35' of cap 35 covered by the tube 37 which also covers the side wall of case 38, the side walls of ribs 56 and 55 of sealing member 42, and the peripheral portion of washer 53. After then, the collector 46 is press inserted into the gel anode 41 through the hole 47, and the bottom plate 44 is inserted into the outer casing can 36, with the peripheral rib 44' of bottom plate 44 covered by a thermo-contractive tube 43, until the bottom plate comes to contact the top collector 46. The opposite end portions of outer casing can 36 are then fastened to the perpheral portions of bottom plate 44 and cap 35 by bending thereon, respectively.

Consequently, if the inner pressure should rise abnormally, the sealing member 42 would be pushed out at the portion thereof in contact with the end portion 57 of case 38, and the gas can leak out of the case 38. The gas that have arrived at there affords a cushion effect at the seal portions of cap 35 and bottom plate 44, by virtue of existence of the tubes 37 and 43 as well as sealing member 42, and then is exhausted. In addition, polyethylene has good permeability to the gas, and the gas that has reached the space 65 through the sealing member 42 is also exhausted similarly. The existence of tube 37 results in increased distance between the inside of case 38 and the outside of cell, so that any liquid electrolyte does not leak out from the cell along with the gas exhaustion.

The existence of non-driable adhesive layer between contact portions of collector 46 and sealing member 42 provides a complete intimate bonding of them to prevent leakage current, and leakage is fully prevented.

The performance of alkali dry cell (C) shown in FIG. 4 will now be described in comparison with that of conventional alkali dry cell (A) shown in FIG. 1 and that of conventional dry cell (B) shown in FIG. 3.

The results of liquid leakage tests are shown in Table I, showing that the new cells embodying the present invention is superior in liquid tightness, and extremely little in danger of liquid leakage. The results of tests on the conventional cells showed remarkable variation, so that maximum and minimum values are given in the table.

TABLE I

| Test Method | Number of liquid leakage among 10 test samples | | |
|---|---|---|---|
| | C | A | B |
| a | 0 | 0-7 | 5-9 |
| b | 0 | 0-10 | 5-10 |
| c | 0 | 0-6 | 5-10 |
| d | 0 | 0-8 | 5-10 |
| e | 0 | 0-9 | 5-10 |

*Test method a.*—After the cells had been discharged at 20° C. through 10Ω resistor to ultimate voltage of 0.75 v., the cells were left stand for one month in short-circuited state.

*Test method b.*—After continuous discharge through 4Ω, the cells were left stand at 30° C. for 100 days.

*Test method c.*—After continuous discharge at 20° C. through 125Ω, the cells were left stand for 30 dayse in short-circuited state.

*Test method d.*—After discharge at 200 ma. constant current, the cells were left stand at 30° C. for 60 days.

*Test method e.*—After continuous discharge through 125Ω, the cells were left stand at 30°C. for 30 days.

With regard to gas permeability, since the conventional cells are sealed by bending of the upper ends of cases, any variation from the normal dimensions of parts cause liquid leakage, while good sealing results in breakage of cells due to gas pressure rise. The relations between internal gas pressures and gas permeabilities are shown in Table II.

TABLE II

| Gas pressure (kg./cm.²) | Gas permeability (c.c./min.) | | |
|---|---|---|---|
| | C | A | B |
| 5 | 0 | 0 | 0 |
| 10 | 0.1 | 0 | 0-0.1 |
| 15 | 0.25 | 0 | 0-0.1 |
| 20 | 0.35 | 0 | 0.6 |
| 30 | 5 | 0 | 0.72-1.0 |

Relations between internal gas pressure rises and gas dissipations due to storage are shown in Table III. New cells (C) do not exhibit gas pressure rise, while conventional cells (A and B) show remarkable gas pressure rises leading to breakage of the cells.

TABLE III

| | C Kg./cm.² | A Kg./cm.² | B Kg./cm.² |
|---|---|---|---|
| After discharge through 10Ω resistance to 0.75 v., left stand for 10 days. | 1-2 | 10-15 | 10-11 |
| After discharge through 10Ω resistance to 0.75 v., left stand for 20 days. | 1-2 | 12-16 | 10-15 |

A hole was made through the casing of each test sample, with a pipe connected to the hole, and hydrogen gas was fed therethrough to the inside of cell, and tests were made to see how the internal gas pressure rise and gas dissipation change along with time. The results are shown in Table IV, in which is shown that new cells (C) are good in gas dissipation.

TABLE IV

| Gas pressure (kg./cm.²) | Time (days) | Gas dissipation (c.c.) | | |
|---|---|---|---|---|
| | | C | A | B |
| 5 | 1 | 0.01 | 0 | 0 |
| | 5 | 0.05 | 0 | 0 |
| | 10 | 0.1 | 0 | 0 |
| 10 | 1 | 1.0 | 0 | 0 |
| | 5 | 10 | 0 | 0 |
| | 10 | 20 | 0 | 0-0.01 |
| 20 | 1 | 15 | 0 | 0-0.1 |
| | 5 | 80 | 0 | 0-1.0 |
| | 10 | 200 | 0.01 | 0-10.0 |

Cell characteristics are shown in FIGS 7 through 12, from which is seen that new cells embodying the present invention are superior to conventional ones.

Figure 7:
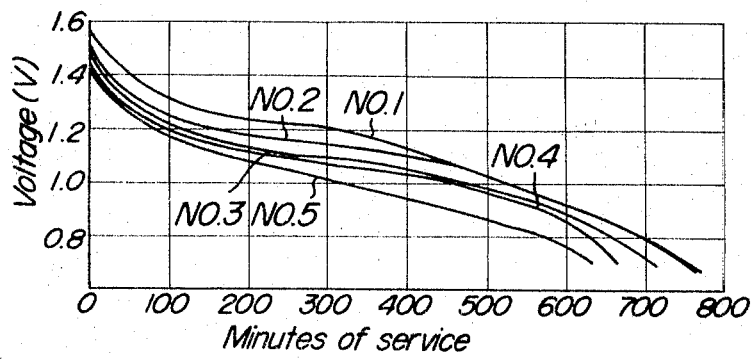
FIGURES 7 and 8 are performance test curves for, respectively, cells embodying the instant invention and prior art cells.

FIG. 7 shows how the capacity of new cell is lowered along with storage at normal temperatures, the capacity being shown by performance of continuous discharge through 10Ω resistance, after storage. No. 1-curve shows the test result for cells directly after manufacture, No. 2-curve shows that for cells after 3-month storage, No. 3-curve for cells after 1-year storage, No. 4-curve for cells after 2-year storage, and No. 5-curve for cells after 3-year storage.

Figure 8:
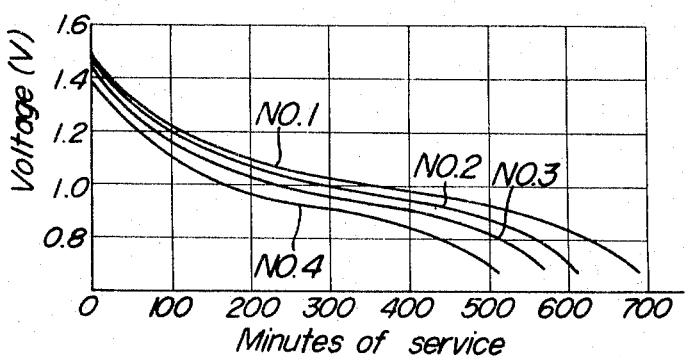

FIG. 8 shows similar test resulst with respect to conventional cells (A). Curves Nos. 1, 2, 3 and 4 correspond to Curves Nos. 1, 2, 3 and 4 in FIG. 7.

Figure 9:
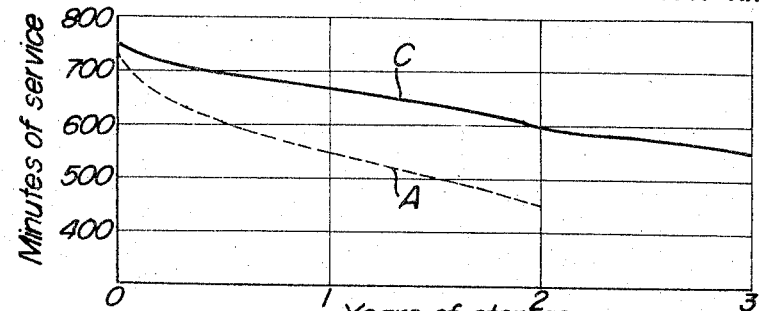
FIGURES 9–12 are curves showing various characteristics of cells embodying the present invention in comparison with conventional ones.

FIG. 9 shows relations between number of years of storage and number of minutes of continuous discharge through 10Ω resistance to 0.75 v.-final voltage, after storage at normal temperatures.

Figure 10:
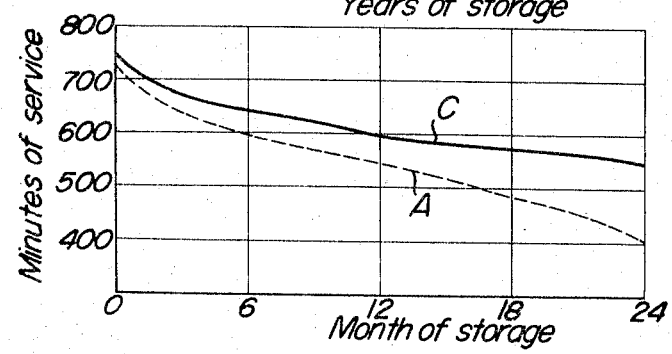

FIG. 10 shows relations between number of months of storage at 45° C. and a number of minutes of continuous discharge through 10Ω resistance to 0.75 v.-final voltage, after storage.

Figure 11:
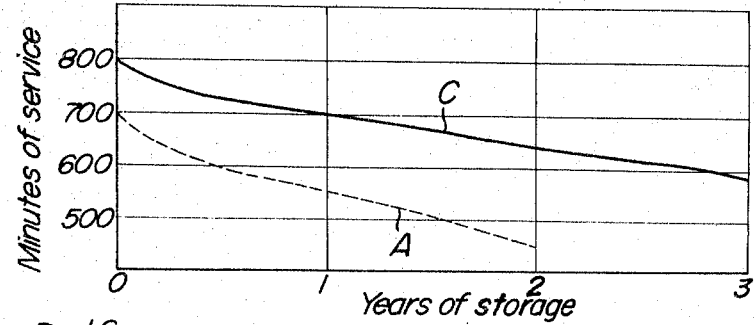

FIG. 11 shows relations between number of years of storage at normal temperatures and number of minutes of continuous discharge through 10Ω resistance to 0.85 v.-final voltage.

Figure 12:
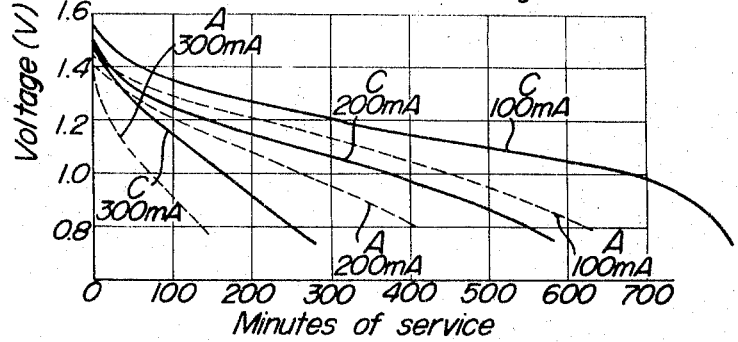

FIG. 12 shows the results of constant-current discharge tests.

As has been clearly understood from the foregoing descriptions, the alkali dry cells of the present invention are superior to conventional ones in prevention of liquid leakage, and discharge performance, as well as stability into storage.

What is claimed is:

1. An alkali dry cell comprising a cathode case having electricity-generating elements accommodated therein and an open end portion curved inwardly, a sealing member of plastic material for sealing said cathode case, and a plastic film covering the side face of said cathode case, and having one end in intimate securing with the periphery of a cathode-terminal plate in contact with the closed end face of said cathode case, and the other end in intimate securing with the periphery of said sealing member, said sealing member consisting of an inner sleeve having a central through hole, with an anode collector passing therethrough and a peripheral stepped portion on which is mounted the inner peripheral portion of a sealing washer, an outer sleeve disposed outside said inner sleeve and coupled therewith by a connecting web with a space formed therebetween, a brim portion formed on the top face of said outer sleeve and on which is mounted the outer peripheral portion of said sealing washer, a rib formed on the lower peripheral portion of said brim portion to form a groove between the same and said outer sleeve, into which groove is inserted said curved open-end portion of said cathode case, an outer casing cylinder, and an anode terminal plate inserted into said outer casing cylinder to contact said anode collector, the end portions of said outer casing cylinder being bent onto the peripheries of said cathode-terminal plate and said anode-terminal plate, respectively, for securing them together.

2. The alkali dry cell according to claim 1, in which said connecting web has a thickness of 0.2 to 1.0 mm.

3. The alkali dry cell according to claim 1, in which said connecting web has a bent step portion.

4. The alkali dry cell according to claim 1, in which said anode collector passes through said central through hole of said inner sleeve of the sealing member, with a non-driable adhesive layer intervening therebetween.

References Cited by the Examiner

UNITED STATES PATENTS

| | | | |
|---|---|---|---|
| 2,289,249 | 7/1942 | Deibel | 136—133 |
| 2,463,454 | 3/1949 | Birdsall | 136—133 |
| 3,042,734 | 7/1962 | Carmichael et al. | 136—133 |
| 3,068,312 | 12/1962 | Daley et al. | 136—133 |
| 3,069,485 | 12/1962 | Winger et al. | 136—107 X |

WINSTON A. DOUGLAS, *Primary Examiner.*

ALLEN B. CURTIS, *Examiner.*

D. L. WALTON, *Assistant Examiner.*